(12) United States Patent
Burgess

(10) Patent No.: US 6,359,970 B1
(45) Date of Patent: Mar. 19, 2002

(54) COMMUNICATIONS CONTROL METHOD AND APPARATUS

(75) Inventor: Shelia Jean Burgess, Oviedo, FL (US)

(73) Assignee: Maverick Consulting Services, Inc., Oviedo, FL (US)

( * ) Notice: Subject to any disclaimer, the term of this patent is extended or adjusted under 35 U.S.C. 154(b) by 0 days.

(21) Appl. No.: 09/293,041

(22) Filed: Apr. 16, 1999

Related U.S. Application Data

(60) Provisional application No. 60/103,653, filed on Oct. 9, 1998, and provisional application No. 60/096,594, filed on Aug. 14, 1998.

(51) Int. Cl.[7] .................. H04M 1/64; H04M 11/00; H04M 1/56
(52) U.S. Cl. ............... 379/67.1; 379/70; 379/88.19; 379/93.23; 379/142.01; 379/142.07
(58) Field of Search .................. 379/34, 49, 67.1, 379/70, 82, 88.01, 88.02, 88.08, 88.09, 88.11, 88.19, 88.2, 88.21, 93.01, 93.03, 93.17, 93.23, 142, 210, 142.01, 142.02, 142.04, 142.06, 142.07, 201.04, 373.01, 373.02, 373.03, 93.05

(56) References Cited

U.S. PATENT DOCUMENTS

| | | |
|---|---|---|
| 4,277,649 A | 7/1981 | Sheinbein |
| 5,029,196 A | 7/1991 | Morganstein |
| 5,060,255 A | 10/1991 | Brown |
| 5,109,405 A | 4/1992 | Morganstein |
| 5,276,731 A | 1/1994 | Arbel et al. |
| 5,388,150 A | 2/1995 | Schneyer et al. |
| 5,467,388 A | 11/1995 | Redd et al. |
| 5,644,629 A | * 7/1997 | Chow .......................... 379/142 |
| 5,724,408 A | 3/1998 | Morganstein |
| 5,790,636 A | 8/1998 | Marshall |
| 5,822,416 A | 10/1998 | Goodacre et al. |
| 5,883,942 A | * 3/1999 | Lim et al. ................... 379/142 |
| 5,946,386 A | * 8/1999 | Rogers et al. .............. 379/265 |
| 5,978,451 A | * 11/1999 | Swan et al. .............. 379/88.24 |
| 6,178,230 B1 | * 1/2000 | Borland ..................... 379/67.1 |
| 6,031,899 A | * 2/2000 | Wu ............................. 379/142 |

* cited by examiner

Primary Examiner—Allan Hoosain
(74) Attorney, Agent, or Firm—James H. Beusse, Esq.; Beusse, Brownlee, Bowdoin & Wolter, P.A.

(57) ABSTRACT

A communications controller is provided for empowering the user of a communications device, such as a telephone or other device, to assume control over incoming communications. Each caller is identified by unique identification information as information associated with an incoming communication. The user selects one of a plurality of different priority levels for a particular caller. The user also selects block time intervals for each priority to indicate times during which calls will not be passed to user's communications device or other appropriate action is to be taken. When that particular caller places a call to the user, the user's communication controller determines the caller's identification information and recalls the priority and corresponding blocking time interval for that particular caller. The call is accordingly passed to the communication device or blocked.

20 Claims, 9 Drawing Sheets

| CID | Caller Name | Index | OGM ID | Announce ID | Priority | Frequency | Counter | Duration | Emergency Op. |
|-----|-------------|-------|--------|-------------|----------|-----------|---------|----------|---------------|
| 300 | 301 | 302 | 303 | 304 | 305 | 306 | 307 | 308 | 309 |

Record 1
•••
Record n

Fig. 3

| Index | Start Time | End Time | Day of Week | Temporary Flag | Priority |
|---|---|---|---|---|---|
| | | | | | |
| | | | | | |
| | | | | | |

Fig. 4

| | Block | Permit | Emergency |
|---|---|---|---|
| Priority 1 | | | |
| Priority 2 | | | |
| ⋮ | | | |
| Priority p | | | |

Fig. 5

Time Block Fuzzy Set for Priority *n*

Caller Priority Fuzzy Set

COMMUNICATIONS CONTROL METHOD AND APPARATUS

This application is a continuation-in-part of U.S. Provisional application, Ser. No. 60,103,653, filed Oct. 9, 1998 and U.S. Provisional application, Serial No. 60/096,594 filed Aug. 14, 1998.

BACKGROUND OF THE INVENTION

This invention relates in general to apparatus and methodology for controlling communications devices. More particularly, the invention relates to apparatus and methodology for permitting a user to control incoming communications supplied to a communications device such as a telephone in one example.

Today's consumer is being constantly bombarded and harassed by an ever-increasing volume of unwanted solicitation phone calls. Fundamentally, solicitors are using the passive telephone device to invade the general public's privacy at any time or within any domain that the solicitors choose. This level of harassment is especially annoying when it comes from a high-pressure and persistent telemarketing source. When posed with the question: "Would you purchase a telephone that would inhibit solicitors from calling you?" The answer is always an emphatic "YES!"

It is very desirable to provide telephone users with the capability of limiting their exposure to such unwanted telephone calls at the user's option. One conventional approach to this problem is the combined telephone/answering machine which permits the user to listen to the caller and then make a real time decision as to whether or not to pick up the telephone receiver and engage the caller. This is referred to as "call screening" in its most basic form. Of course, the user also has the option of listening to the caller's message at a later time and then making a decision as to whether or not to call back.

Another method of limiting the user's exposure to unwanted phone calls is described in U.S. Pat. No. 5,060,255 to Brown entitled "Telecommunications System With Timed-Do-Not-Disturb". This patent discloses a telephone system that enables a subscriber to designate time periods during which no incoming calls are to be received over the subscriber line. Any calls dialed to the subscriber directory number at such times are diverted to a voice response unit that issues an appropriate announcement to inform the caller of the unavailability of the dialed number station. This timed call block feature is implemented in the telephone company's central office or switching facility.

Another call screening approach is disclosed in U.S. Pat. No. 5,467,388 issued to Redd, Jr. et al. entitled "Method And Apparatus For Selectively Blocking Incoming Telephone Calls". In that patent, a system is disclosed for allowing a telephone subscriber to selectively block incoming calls for selected time periods or during programmed time intervals. In this approach, the call screening is again conducted at the telephone company's central office or switching facility.

One more conventional call screening technique is described in U.S. Pat. No. 4,277,649 issued to Sheinbein entitled "Method And Apparatus For Screening Telephone Calls". In that patent, a telephone system is disclosed in which a called customer or user can screen calls incoming to his station based on the identity of the calling line. The calling line's identity is forwarded to the switching office containing the called customer's screening memory. The memory is interrogated to ascertain the call disposition based on information previously put in the memory by the called customer. In this approach, the screening process is once again dependent on screening conducted at the telephone company's central office or switching facility at which a centralized database is located.

SUMMARY OF THE INVENTION

Accordingly, one object of the present invention is to provide a method and apparatus for limiting a communications device user's exposure to undesired communications by employing advanced control mechanisms implemented at or near the communications device.

Another object of the present invention is to provide a method and apparatus for limiting the user's exposure to undesired communications by employing advanced control mechanisms at the telephone service switcher and which are provided to the consumer as a service.

Another object of the invention is to provide communications device control methodology and apparatus which permits the consumer to proactively take control of how, when, and if the consumer responds to incoming communications.

Yet another object of the invention is to provide a methodology and apparatus for transforming the communications device (e.g., telephone, computer, and/or television) from a passive device to a controllable device that incorporates individual time management values and customized consumer priorities.

One more object of the invention is to provide a communications device control apparatus in which incoming communications are managed and controlled depending on the time-of-day, frequency, type, duration, and priority rating of the particular communications being received.

In accordance with one embodiment of the present invention, a method is provided for processing an incoming communication from a calling party sent to a communications device of a receiving party. The disclosed method includes the step of storing a caller database including a plurality of records. Each record includes caller identification information corresponding to a particular caller and a respective priority selected from a plurality of priorities. The method also includes the step of storing a blocking time database including a plurality of records respectively corresponding to the plurality of priorities and further including respective blocking time information for each priority. An incoming communication including caller identification information is received. The time that the incoming communication is received is determined to provide a call received time.

The caller database is then searched to find a record having caller identification information matching the caller identification information of the incoming communication and the respective priority for that record is retrieved to produce a retrieved priority. The blocking time database is searched to determine blocking time information associated with the retrieved priority to produce retrieved blocking time information. The call received time of the incoming communication is compared with the retrieved blocking time information. The method further includes the step of blocking the incoming communication if the call received time occurs during a blockout time indicated by the retrieved blocking time information and otherwise permitting the incoming communication to be routed to the user of the communications device. The method further includes the step to check if the call being blocked is an emergency call that will be routed according to the consumer pre-selected options.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 3 depicts the structure of a Caller ID database as it relates to the primary fields needed to support the processing logic of the Communications Controller.

FIG. 4 depicts the structure of a Time Block database as it relates to the primary fields needed to support the processing logic of the Communications Controller.

FIG. 5 depicts the look-up-table structure, which provides operational settings that are consequential functions related to the incoming call time and caller priority conditions.

DETAILED DESCRIPTION OF THE INVENTION

The disclosed Communications Controller virtually rids the receiving party of constant, non-value-added disruptions from unwanted incoming communications (e.g., phone calls and/or electronic media). Advantageously, the disclosed controller enables consumers to regain value-added control of their personal time.

For purposes of illustration only, and not to limit generality, the Communications Controller will be explained with reference to its use in processing incoming telephone calls as one example of its application. The Communications Controller includes automated control logic that intelligently integrates communication routing and screening functions. The controller manages and controls incoming communications depending on the time-of-day, frequency, type, duration, and priority rating of the received communication.

The disclosed Communications Controller enables the consumer to effectively control the time of day or night that a phone call is permitted to ring/announce an incoming call. It also permits the consumer to establish priorities for incoming calls. These priorities are then used to automatically route calls through the phone and to the consumer in a manner that suits the consumer's specific needs and values. If desired, unwanted incoming phone calls (e.g., from solicitors and harassers) will not even ring. Therefore, at the option of the receiving party, the receiving party is not disturbed. The disclosed controller advantageously transforms the telephone into a controllable device which provides efficient and effective timely, value-added communication.

The disclosed communications controller is first described as it functionally relates to other telecommunication device functions. Later, representative hardware for implementing the controller is described in detail.

Figure 1:
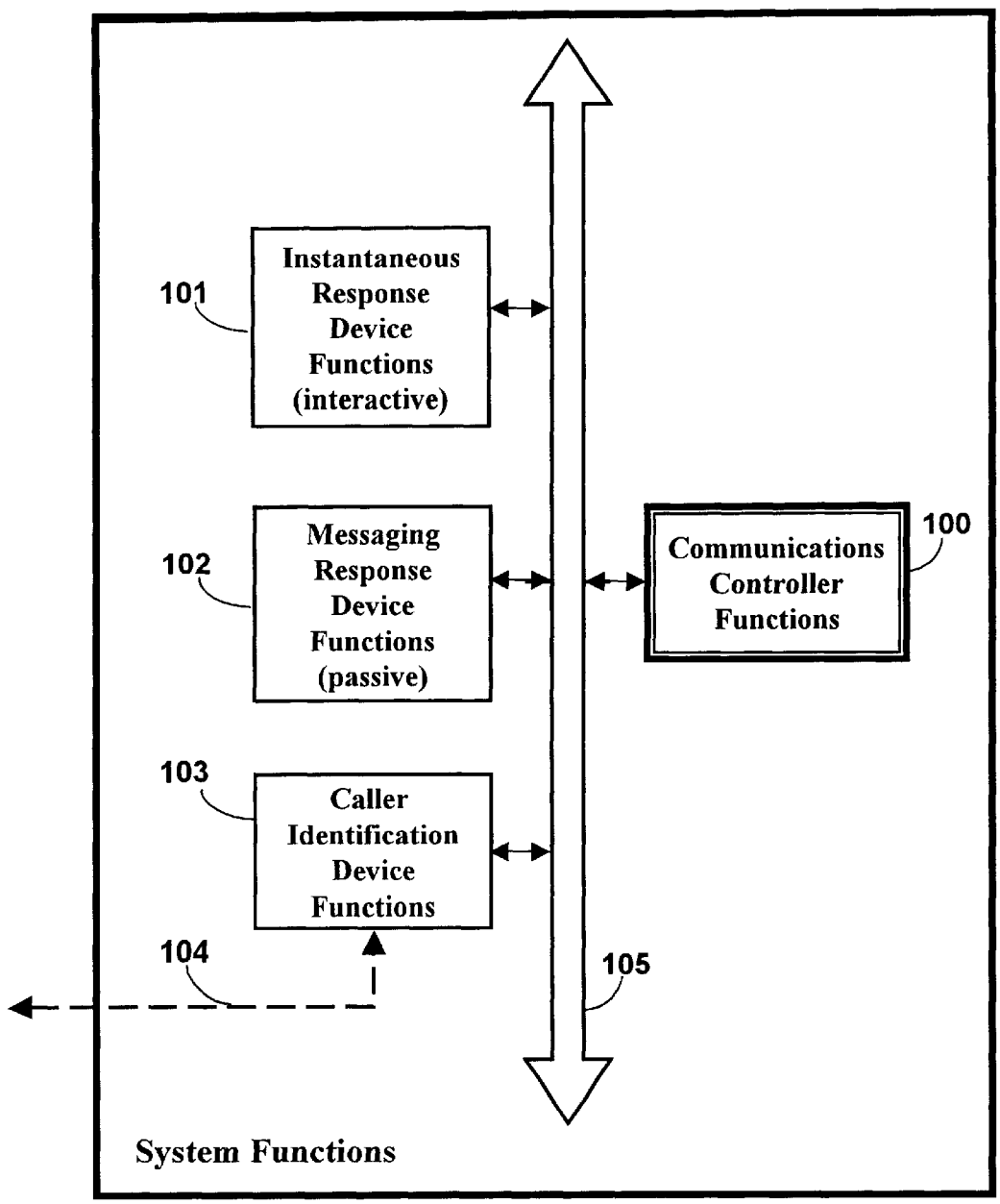
FIG. 1 is a functional block diagram showing the overall relationship of the disclosed Communications Controller relative to other telecommunication device functions.

More particularly, FIG. 1 is a functional block diagram showing the overall relationship of the disclosed Communications Controller 100 relative to other telecommunication device functions. The processing provided to a particular incoming telephone call by the Communications Controller is time and incoming call priority dependent. It is noted that the Communications Controller and associative control logic can be applied and implemented as a consumer product along with other consumer telephony devices (e.g. telephones, answering machines, Caller ID devices, computers, telephone/television solutions). The Communications Controller can also be implemented at the telephone service switcher and provided to the consumer as a telephone service.

In one embodiment, the Instantaneous Response Device Functions 101, Messaging Response Device Functions 102, and Caller Identification Device Functions 103 may be implemented as an integrated device or independently to support the Communications Controller Functions 100 as indicated in FIG. 1.

The Instantaneous Response Device Functions 101 (e.g., telephone device) provide the interactive support needed for a communications device such as a telephone. Examples of the support this device provides are ring/announce, call forward, call waiting, and paging the user for immediate response to the incoming call.

The Messaging Response Device Functions 102 (e.g., answering machine) provide the passive support needed for a communications device. Examples of the support this device provides are to play, store, and record message data (e.g., voicemail, email, multimedia mail) to which the user can respond at their convenience but not necessarily during the time the call/contact is being placed or made. The communications line 104 (e.g., a telephone line or cable) that connects to other communication devices is coupled to the Caller Identification Device Functions 103.

The Caller Identification (ID) Device 103 sends incoming call data such as Caller ID data to Communications Controller 100. Communications Controller 100 processes incoming calls using the Caller ID data received. If the incoming Caller ID data is not available for a particular incoming call, then Communications Controller 100 uses Messaging Response Device (e.g. Answering Machine) Functions 102 to play an Out Going Message (OGM) prompting the caller for their identification data. Upon the Communications Controller 100 attempting to obtain this data, it will continue processing the call. As a result, the Communications Controller 100 will either use the:

1) Instantaneous Response Device Functions 101 to ring/announce via the telephone device, forward the call, page the person being called, support remote control of the device, terminate the call, notify the user of call waiting via a specific beep indication or, 2) Messaging Response Device (e.g., Answering Machine) Functions 102 to play an appropriate OGM and permit the caller to leave a message.

The interface 105 supports communications to transmit and route data among the above described system functions in FIG. 1.

Incoming Caller ID data can either be originating device dependent (identifier associated to the call origination device) or caller dependent (identifier associated to the individual caller/person). Consumer products for the Caller Identification Device Functions 103 using today's technology are device dependent—they provide the caller's phone number and/or name. However, depending on the implementation of the Communications Controller 100, this data could be the I.P. Address of a node on a network or other device identifier data. Conversely, caller dependent Caller ID data can utilize such elements as:

1) Caller personal account data (e.g., account number, email address, Internet address, etc.);
2) Speaker dependent voice data—person identifying themselves by speaking their name in order to capture their temporal phonic signal data; and
3) Video data—a video frame of a caller's unique identifiers (e.g., the caller's face, retinal scan, finger/thumb print, etc.)

In this embodiment, the Communications Controller 100 is not dependent on the Caller ID data/media type. Rather, controller 100 merely conforms to the data type being used by the Caller Identification Device Functions 103, which is an external interface to Communications Controller 100. Communications Controller 100 merely utilizes this data associated with the caller regardless of its type (e.g., device dependent or caller dependent) to determine the given priority of the caller. (Communications Controller 100 uses the incoming Caller ID data to attempt to match this data with the Caller ID data stored in its database for a call priority determination.)

Figure 2A:
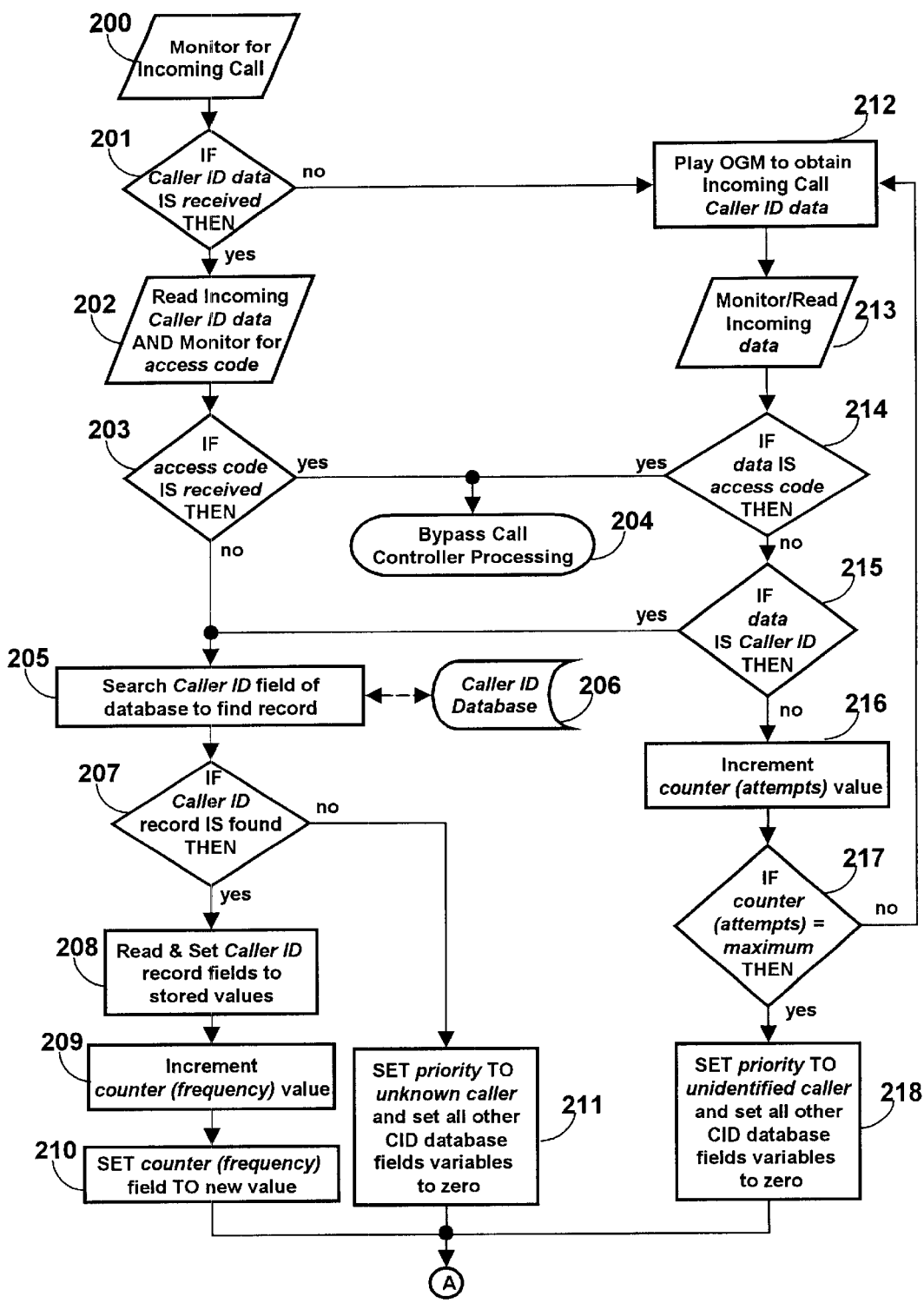
FIGS. 2A and 2B are the flow diagrams of the Communications Controller system operation.
Figure 2B:
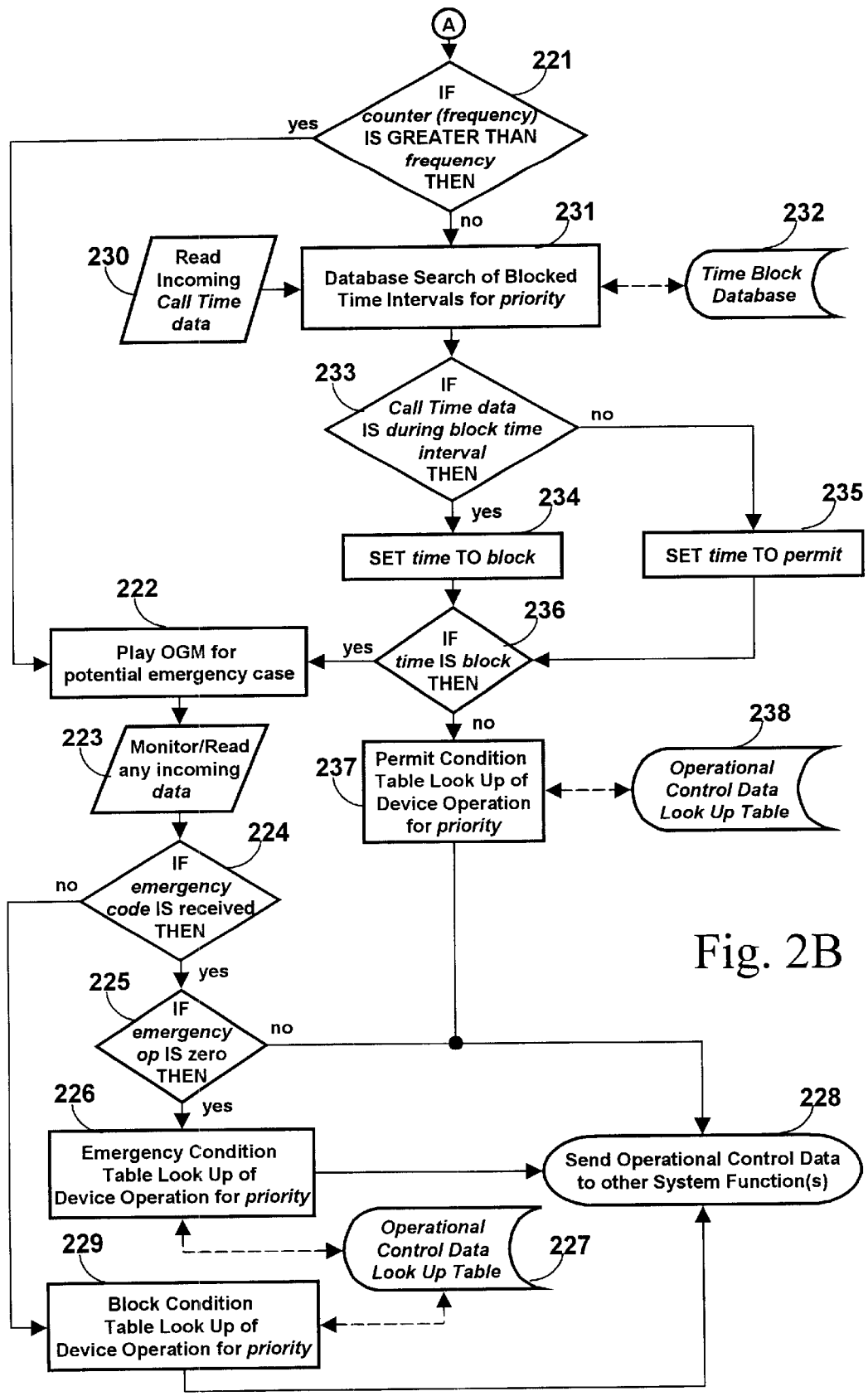

FIGS. 2A and 2B together form a flow diagram depicting the flow of operations carried out by the Communications Controller 100 system. The steps shown in FIGS. 2A and 2B provide an example of the control logic necessary to route and handle an incoming call. Operation commences at the monitor for an incoming call step 200, and upon the condition of an incoming call being received, a test is performed by Communications Controller 100 at decision block 201 to determine if the incoming Caller ID data is present. If the Caller ID data is present, it is read for further processing and monitoring for an access code input from the caller is performed at 202. A check is performed in 203 to determine if an access code is present. Upon receiving an access code, the Communications Controller logic is by-passed and the control of the call is routed directly to the Instantaneous Response Device 101 as indicated at bypass block 204. However, if the Caller ID data is not present, then at 212 an Outgoing Message (OGM) is played to request the caller to provide their Caller ID data. The Communications Controller 100 then monitors and reads the provided data as indicated at block 213.

A test is then performed at 214 to determine if an access code is present. Upon receiving an access code, the Communications Controller logic is by-passed and the control of the call is routed directly to the Instantaneous Response Device 101 as indicated at bypass block 204. However, if no access code is found at test 214, a check is performed at 215 to see if Caller ID data has now been provided by the caller. The Communications Controller 100 then monitors for Caller ID data to be received. If test 215 determines that Caller ID data is not received, the attempt to obtain Caller ID data from the caller is incremented 216. A check is performed at 217 to determine that the number of times the caller has been asked to provide their Caller ID is less than the maximum times permitted. If the maximum attempts are not exceeded, then Communications Controller 100 is programmed to send control information to the telephone device to hang-up or reiterate the request (OGM) to obtain the Caller ID information as indicated at block 212. This iterative process can reoccur a selected number of times based upon a maximum value. When the caller fails to provide valid Caller ID data after being provided with the maximum number of attempts, the priority of the phone call is set to an unidentified caller in block 218 to support further processing.

However, if test 215 finds that the caller has provided their Caller ID data, then a Caller ID database search is invoked at 205 on the Caller ID data field of Caller ID database 206. This search attempts to locate the record associated with matching Caller ID data field contents to the Caller ID currently determined. If the Caller ID match is found at matching test 207, then each field value of the matching record (for example: name, index, priority, OGM ID, announce ID, frequency, counter (frequency), duration and emergency operation) is read or obtained at 208 to support further processing. Then, the Counter(frequency) field is incremented at 209 and the new Counter(frequency) value is stored at 210 for further processing. (The purpose of this Counter(frequency) field is to provide the user with a pre-selected number of times a particular Caller ID can place a call over a specified period of time (say 24 hours) so as to limit being pestered by continuous calling from a particular caller.) If a Caller ID match is not found at 207, then the priority field value is set to indicate that the caller's identity (unknown caller) does not have a record associated to it in the Caller ID database 211. Also, all fields of a Caller ID record (for example: name, index, priority, OGM ID, announce ID, frequency, counter (frequency), duration and emergency operation) are set to zero to support further processing in block 211.

It is noted that the Caller ID data could either be caller dependent or device dependent. For example, the Caller ID data could consist of the originating call telephone number or I.P. Address for a network implementation for the device dependent data. Conversely, caller dependent data could consist of the caller video image data, speech pattern data, and/or personal account identification data.

If at test 221 the new Counter (frequency) field is found to be greater than the Frequency field (see FIG. 2B) of the record, then the Communications Controller 100 is programmed to send control information to the telephone device to inform (OGM the caller that the call is being blocked unless they indicate that the call is an emergency 222. This call is routed to the blocked condition with an opportunity to place an emergency call 222 since the number of allowed calls for a particular caller within a predetermined time period (say 24 hours) has been exceeded.

Processing commences at the Monitor for inputs from the caller in block 223. Check 225 is made to determine if an emergency code has been received. If no emergency code is received, the call will be possess a blocked condition 229. The blocked condition along with the determined caller priority condition will be used to lookup the consequential telephone operation data in 227. This relevant operation data of the device is read from lookup table 227 and the corresponding control data is sent to the system functions at 228 (shown earlier in FIG. 1) as required to support the operation specified (e.g., ring pattern, announce selection, OGM selection, record message, terminate the call, call forward, beep selection for call waiting, etc.). The operation control data that is retrieved from the Lookup Table 227 will be sent to the device functions and the call will be processed as a blocked condition 228.

If an emergency code has been received in check 224 then, another check 225 is performed to determine if the emergency operation code is valid. Upon a valid emergency operation code (this code is the consequential telephone operation data to be used for the conditions it supports), this consequential telephone operation data will be sent to the system functions 228. However, if the emergency operation data is not valid, the emergency condition 226 along with the determined caller priority condition will be used to lookup the consequential telephone operation data in block 227. The operation control data that is retrieved from the Lookup Table 227 will be sent to the device functions. The call will be processed as an emergency call 228.

However, if the new Counter (frequency) field is less than or equal to the Frequency field 221, then processing to determine the time blocks for the priority of the Caller ID will continue as indicated at 231.

The call time data is then read at step 217. The call time data includes the hour, minute, day, and date values the incoming call was received. A Time Block database 231 search is performed to obtain all blocked times 232 for the particular call priority. The call time data is compared to the time block intervals associated with the call priority. If at test 233 it is found that the time of the call is during a time block interval, then the time is set to "block" at 234 for the particular priority of the incoming call. However, if the time of the call is not during a time block interval 233 then, the time is set to "permit" for the particular priority of the incoming call 235. If time is set to "block" then the opportunity for the caller to classify their call as an emergency is presented 222. If time is set to permit 237, then the permit condition of the lookup table 227 is used to obtain the consequential telephone operation data as shown at 228.

FIG. 3 depicts a caller database structure employed in one embodiment of the disclosed Communications Controller. The purpose of this database is to provide the Communications Controller with storage of incoming Caller ID data associated with the user's set priority data for that particular caller type. This database structure is employed by the earlier discussed Caller ID database search of FIG. 2A to obtain the priority of the incoming call.

This caller database structure includes a plurality of records 310 that are designated as Records 1 . . . n. As shown in FIG. 3, each record includes an incoming Caller ID (CID) field 300; a caller name field 301; an index field 302; an OGM ID field 303; an Announce ID field 304; a caller Priority field 305; a Frequency field 306 which contains the set limit or maximum number of times the caller can potentially ring through over a selected period of time; a Counter field 307 which cooperates with the Frequency field 306 to track the number of times a particular caller has placed a call within the selected period of time (e.g., 24 hours); a Duration field 308 (the duration field supports the user selected amount of time they typically allot to speak with a particular caller so as to budget their time); and an Emergency operation field 309 (this field contains the consequential telephone operation control data to be used for the conditions it supports).

The incoming Caller ID 300 is the unique identifier for the incoming call. With today's technology, the Caller ID is the call origination phone number. However, alternatively Caller ID 300 could be supported by speech/voice recognition data (namely unique speech or voice information), and/or image processing data (unique picture information) as well. The caller name field 301 can be used to store the name associated with the incoming Caller ID 300. The index field 302 is used for maintenance of the Communications Controller 100. Upon the database memory becoming inadequate to store additional records 309, the Communications Controller 100 can select a candidate based on which record is the lowest priority and is the most dormant per the index 302 indication. This candidate record memory allocation can then be used to store new data in these fields. The OGM ID 303 field contains an identifier for a specific OGM to be played for the particular Caller ID data. The Announce ID 304 field also contains an identifier for a specific Announcement to be played for the particular Caller ID data. The priority field 305 is used to store the relative priority of a Caller ID based on the user's needs/selection. For example, a representation of relative priorities is given in the following TABLE 1 wherein Priority 1 is the lowest priority and Priority 8 is the highest priority:

TABLE 1

Priority 1—harassment (lowest priority)
Priority 2—solicitations
Priority 3—friendly but not in the database
Priority 4—vendors/affiliations
Priority 5—work/business
Priority 6—secondary friends
Priority 7—primary friends/distant family
Priority 8—close family (highest priority)

FIG. 4 depicts a blocking time database structure employed by one embodiment of the disclosed Communications Controller 100. This blocking time database structure is used by test 220 of FIG. 2B to determine if the incoming call is to be blocked or permitted based on the time of the call being received. The database structure includes a plurality of records 406 designated as records 1 . . . m. Each record defines a time block interval, namely an interval of time that the user does not wish incoming calls of specified priority to cause their telephone to ring or announce the caller.

Each of records 1 . . . m includes an index field 400, a block time interval start time field 401, a block time interval end time field 402, a day of the week field 403, a temporary flag 404, and the priority field 405. The index field can be used for internal Communications Controller 100 processing. The start time field 401 provides the hour and minute the time block interval begins. The end time field 402 provides the hour and minute the time block interval ends. The day of the week field 403 provides the days during the week that the time block interval is active. The priority field 405 is used to store the relative priority of a caller based on the user's needs. For example, a representation of a time block interval could be from 10:00 p.m. to 5:00 a.m., Sunday through Friday, blocking all priorities except Priority 8—family callers. The temporary flag field 404 is the flag that indicates the time block interval is temporary. This flag supports the silence mode of this invention. The Silence mode permits the user to select a relative period of time to block their phone calls. For instance, the next 2 hours put all calls in the block mode with user selected call priority exceptions.

FIG. 5 depicts a representative lookup table structure employed in the disclosed Communications Controller 100. The lookup table structure is used by tests 224 and 236 of FIG. 2B to obtain the consequential operation control data for the integrated telephone device functions. These consequences are based on conditional results being present. In particular, the lookup table structure includes a plurality of records 504 designated 1 . . . p, which is dependent of the number of caller priorities employed an any particular embodiment of Communications Controller 100. For example, in the disclosed embodiment wherein Priorities 1–8 are referenced in Table 1 above, p would have a value of 8.

With the combined conditions of the call being placed during the block time 501 and the priority 500 of the incoming call being specified, the desired consequential operation of the telephone device is defined. (It should be recalled that the controller retrieves the block time information from the blocking time database of FIG. 4 and that the controller retrieves the priority of the incoming call from the caller data base of FIG. 3.) With the combined conditions of an emergency call being placed during the block time 503 and the priority 500 of the incoming call being specified, the desired consequential operation of the telephone device is defined. Again, with the combined conditions of the call being placed during the permit time 502 and the priority 500 of the incoming call being specified, the desired consequential operation of the telephone device is defined. The operations of the telephone device include the Caller Identification Device Functions 103, Messaging Response Device Functions 102, and Instantaneous Response Device Functions 101. Some of these operations include but are not limited to the following:

Provide a specified ring pattern (of multiple ring pattern options)

Provide a specified announcement for a particular caller

Provide a specified OGM with or without an opportunity for the caller to leave a message (of multiple OGM options)

Terminate the call (e.g., hang-up without ringing the telephone device)

Figure 6:
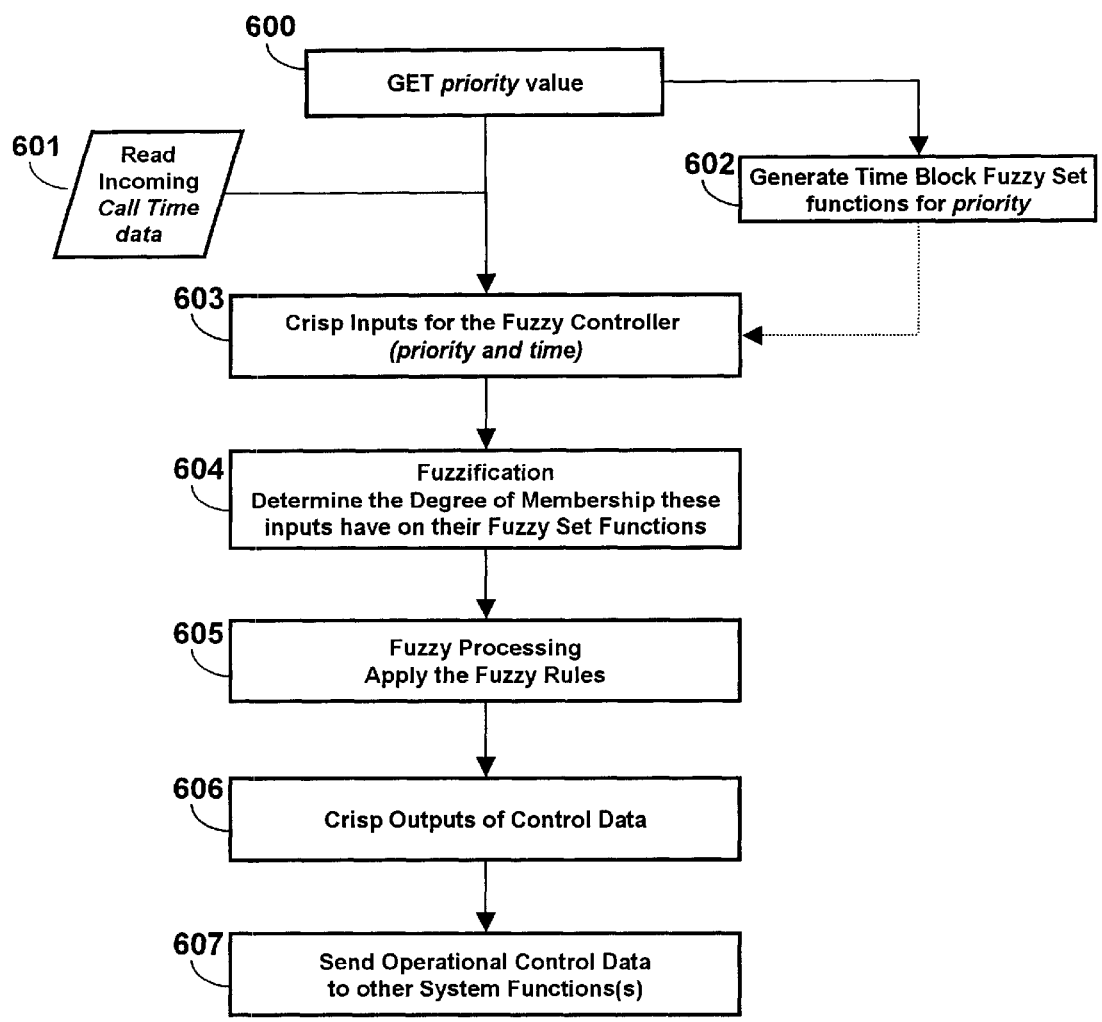
FIG. 6 is a flow diagram depicting the unique Fuzzy Logic controller system operations.

Call Forwarding/paging upon a call being routed to ring and the user pre-selecting this option Call waiting will transmit a beep signal for the user while on the phone. This beep could be mapped to a priority level beep type to inform the user of the importance of the call prior to them disrupting their present conversation In one embodiment, a software implementation of the Communications Controller 100 can be coded to support the flow diagram of FIGS. 2A and 2B directly. This approach will be discussed later. However, another approach to the software implementation for the control logic of the Communications Controller is to employ Fuzzy Inference Logic (FIL). FIG. 6 depicts the flow diagram of the unique processing required to support FIL processing. It is noted that the same initial processing flow as depicted in FIG. 2A is employed to monitor for an incoming call. The priority is obtained at step 600 and the call time data is obtained at 601. Then fuzzy set membership functions are generated for that particular caller priority 602. The crisp values for the caller priority and time are obtained at 603 and are used to operate on the fuzzy sets of the FIL. This fuzzifies the data to a degree of membership relative to the values as indicated at step 604. Then, FIL rules are applied at 605. The rule that yields the strongest result is considered the consequential functional operation that the device should perform which is mapped to the crisp outputs as indicated at 606. This output operation control data is then routed to the other telephone functions at 607.

Figure 7:
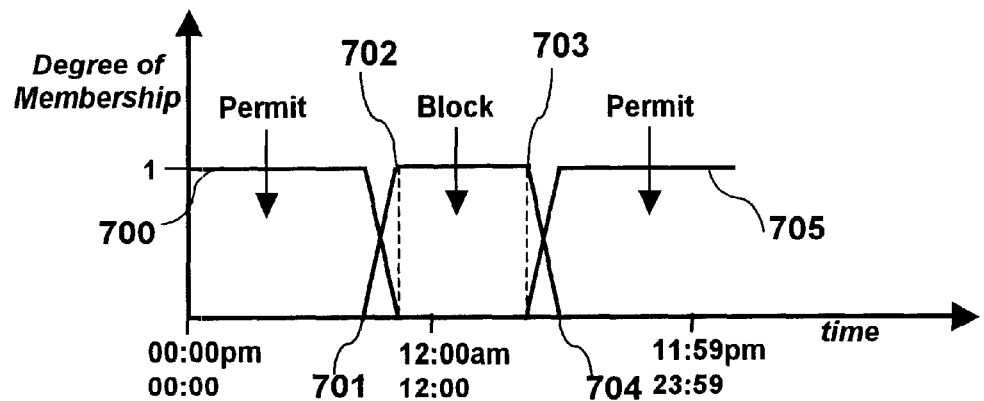
FIG. 7 is a graph depicting a representation of the Time Block Fuzzy Set membership.
Figure 8:
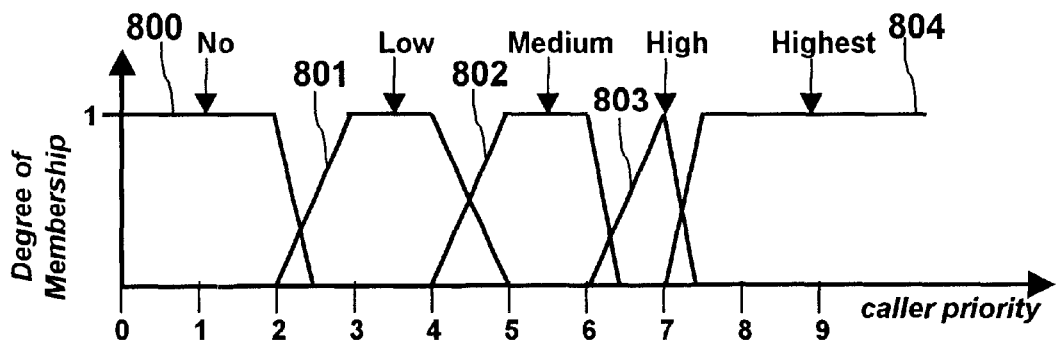
FIG. 8 is a graph depicting a representation of the Caller Priority Fuzzy Set membership.

By way of example, the FIL implementation could utilize 2 conditional fuzzy sets. One conditional fuzzy set is for the block time conditions for a particular priority, a representation of which is shown in FIG. 7. The other conditional fuzzy set is the relative caller priority as depicted in FIG. 8.

The crisp inputs to this FIL are:

1) Relative values of actual time of call in hour/minute/day data

2) Relative value of caller priority as pre-selected by the user this example employs the following associated crisp values:
   1=Priority 1—harassment (lowest priority)
   2=Priority 2—solicitations
   3=Priority 3—friendly but not in the database
   4=Priority 4—vendors/affiliations
   5=Priority 5—work/business
   6=Priority 6—secondary friends
   7=Priority 7—primary friends/distant family
   8=Priority 8—close family (highest priority)

For a particular caller priority, the block time interval functions are generated based on the duration of the time interval. As seen in FIG. 7, one approach for achieving the time block interval functions is to have the function possess a degree of membership of 1 for 90% duration about its center between 702 and 703. The remaining 10% of the duration is divided between the intervals of between points 701 to 702 and 703 to 704. For example, if the block times interval started at 9:00 p.m. and ended at 6 a.m. yielding duration of 540 minutes, 90% of this interval is duration of 486 minutes 702 and 703, which would possess a degree of membership of 1. The remaining 54 minutes divided by 2 yields 27 minutes duration. For the starting point of the resulting function, the degree of membership is 0 ramping to a degree of 1 within the 27-minute duration 701, 702. For the ending point, the degree of membership is 0 at the end point of the block time interval and 1 within the last 27 minutes of the block time interval. Conversely, the permit time interval functions can be generated applying this same logic.

FIG. 8 depicts a representation of the Caller Priority Fuzzy Set. This Fuzzy set possesses the membership functions as they relate to the crisp priority input values. This representation maps the caller priority to the following relative incoming call conditions:

No priority 800

Low priority 801

Medium priority 802

High priority 803

Highest priority 804

Figure 9:
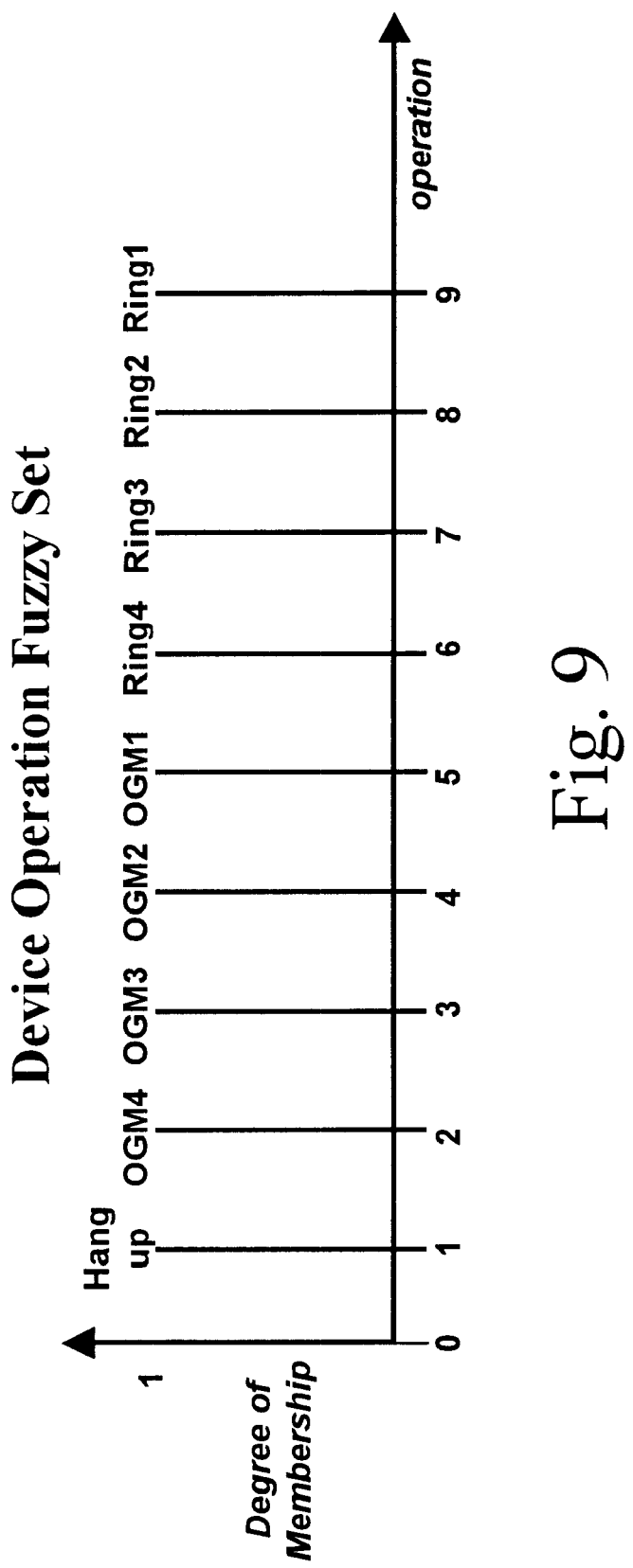
FIG. 9 is a graph depicting a representation of the consequential Communications Controller Operations Fuzzy Set membership. This representation uses singletons to map directly to crisp solutions.

For simplicity, this example utilizes a Singleton output Fuzzy set for the consequential functional operations as shown in FIG. 9, which yields crisp outputs as follows:
   1=hang-up=no priority call
   2=OGM4=low/no priority OGM message
   3=OGM3=medium priority OGM message
   4=OGM2=high priority OGM message
   5=OGM1=highest priority OGM message
   6=Ring4=low priority ring pattern
   7=Ring3=medium priority ring pattern
   8=Ring2=high priority ring pattern
   9=Ring1=highest priority ring pattern It is noted that this Singleton crisp logic is directly applicable to the software implementation of FIGS. 2A and 2B. Also, other elements could be added to this Singleton logic such as the beep pattern type for different priorities of call waiting.

Figure 10:
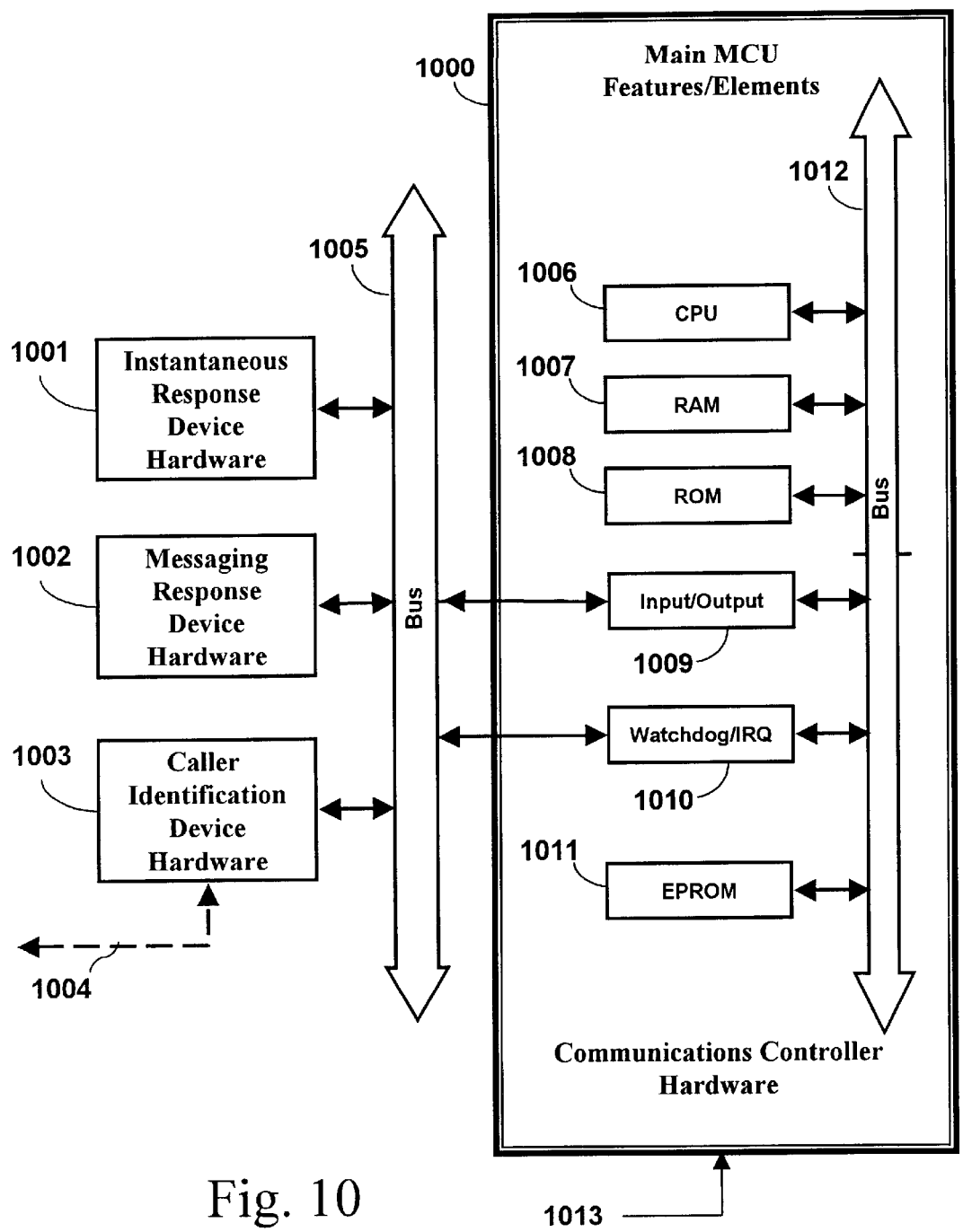
FIG. 10 is a block diagram of the hardware needed to support the Communications Controller. The implementation of the hardware can either be as a standalone unit that interfaces to Instantaneous Response Device, Messaging Response Device, and Caller Identification Device functions or an integrated element/feature set.

A representative set of Fuzzy Rules for these conditional Fuzzy Sets is as follows:

if Time is Block and Priority is No then Operation is Hang-up;

if Time is Block and Priority is Low then Operation is OGM4;

if Time is Block and Priority is Medium then Operation is OGM3;

if Time is Block and Priority is High then Operation is OGM2;

if Time is Block and Priority is Highest then Operation is OGM1;

if Time is Permit and Priority is No then Operation is OGM4;

if Time is Permit and Priority is Low then Operation is Ring4;

if Time is Permit and Priority is Medium then Operation is Ring3;

if Time is Permit and Priority is High then Operation is Ring2;

if Time is Permit and Priority is Highest then Operation is Ring1;

For the purpose of discussion, and not for the purpose of limitation, FIG. 10 depicts a high level hardware implementation of the FIG. 1 Communications Controller as Communications Controller 1000. Controller system 1000 employs a microcomputer (MCU). Utilization of a MCU for this type of application is a typical solution/implementation. However, the functions indicated in FIG. 1 can be integrated together or packaged separately in numerous configurations. These configurations can range from MCU's to Personal Computer Systems and/or a Telephony/Television System.

To clearly describe the hardware support functions required for the Communications Controller 1000 of FIG. 10, the following example of the steps performed upon receiving a call is explained along with details as they relate to the hardware of Communications Controller 1000. Communications Controller 1000 is coded with software according to the flow diagrams of FIGS. 2A. This software code is stored in memory within controller 1000 in one embodiment. When executed by controller 1000, this software causes controller to implement the steps set forth in the flow diagrams of FIGS. 2A and 2B.

Data is received and transmitted across the Bus 1005 to permit the Instantaneous Response Hardware 1001 (e.g. a telephone), the Messaging Response Hardware 1002 (e.g. an answering machine) the Caller Identification hardware 1003, and Communications Controller 1000 to communicate.

Upon receiving a call via the communications line 1004, the Caller Identification hardware 1003 receives the incoming Caller ID data. An interrupt is then generated from the Caller Identification Hardware 1003 and sent to the Communications Controller Watchdog/IRQ 1010. This Watchdog/IRQ 1010 (e.g. an interrupt controller) monitors for reception of an interrupt that designates a call is being received. After this interrupt, the Caller ID data is transmitted from the Caller Identification Hardware 1003 via the bus 1005 to the Communications Controller MCU Input port(s) 1009. The data is transmitted via the internal Bus 1012 to the MCU RAM 1007.

This Caller ID data is then compared against data stored in ROM 1008 to obtain priority information as explained in the description of FIG. 2A and 2B flow diagrams. CPU 1006 performs the processing software execution, which in turn provides the control logic for the controller according to the described flow diagrams. The RAM/ROM 1007/1008 provides the memory necessary to support the load of the executable code and memory to support the real-time processing. The EPROM 1011 provides the storage necessary to support the caller database of FIG. 3 and the blocking time database of FIG. 4 as well as the look up table of FIG. 5. The internal bus 1012 is used to support "local" communications among the various functions within the Communications Controller 1000.

In one embodiment, input values such as user selected priority and blocking time intervals are provided to communication controller 1000 by the user inputting such values to the Instantaneous Response Hardware 1001 (e.g. telephone device). These values are then transmitted to Communications Controller 1000 for storage in the memory therein. Alternatively, an input device such as a keyboard device or personal computer can be coupled to communications controller 1000 at input port 1013 to provide input for such values.

While a method for controlling incoming communications has been described above, it is clear a communications system for processing incoming communications which include caller identification information is also disclosed. In summary, the disclosed system includes a caller identification device for receiving the incoming communication and extracting caller identification information from the incoming communication. The system also includes a user communications device for receiving and providing an incoming communication to a user of the communications device. The system further includes a communications controller coupled between the caller identification device and the user communications device. In one embodiment, the controller includes a processor for executing code to control the transmission of incoming communications to the user communications device. The controller further includes a memory for storing code for execution by the processor to control the transmission of incoming communications to the communications device. The stored code includes a caller database having a plurality of records, each record including caller identification information corresponding to a particular caller and a respective priority selected from a plurality of priorities. The stored code also includes a blocking time database having a plurality of records respectively corresponding to the plurality of priorities and including respective blocking time information for each priority. As discussed earlier in detail, depending on the time that a particular incoming communication is received and which of the plurality of priorities it is accorded, the communication is blocked, permitted or other appropriate action is taken.

In summary, the disclosed method and apparatus advantageously limits a communications device user's exposure to undesired communications by employing advanced control mechanisms implemented at or near the communications device in one embodiment. The control methodology and apparatus permits the consumer to proactively take control of how, when, and if the customer responds to incoming communications. Advantageously, the disclosed methodology transforms the communications device (e.g., telephone, computer, and/or television) from a passive device to a controllable device that incorporates individual time management values and customized consumer priorities. Incoming communications are managed and controlled depending on the time-of-day, frequency, type, and priority rating of the particular communications being received. In this manner, the user is empowered to take control over incoming communications.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A system for receiving incoming communications in a receiving party's communication device comprising:
    means for receiving and storing incoming communications originating source criteria, the incoming source criteria depending upon an identity of the incoming communication type and wherein the communication type is selected from the group consisting of a voice type, an internet content type, a video type, a multimedia type, a fax type, and a broadcast media type;
    means for receiving and decoding an emergency condition from an incoming communication source;
    means for retrieving the incoming communications originating source criteria;
    means for processing the incoming communications originating source criteria and time criteria;
    means for storing incoming communications; and
    means for providing an indication of an incoming communication to a user of the system, as a function of the processed criteria.

2. The system of claim 1 further comprising means for using the communications originating source criteria and the associated time criteria along with the current time criteria to determine a functional operation of the system.

3. The system of claim 2 and including means for initiating a search routine for searching the incoming communication criteria stored in the system to find a match with each incoming communication.

4. The system of claim 1 and including means for comparing the present time criteria with stored time criteria associated with a present incoming communication source criteria to determine time management functions to use for the present incoming communication.

5. The system of claim 4 and including means for determining a set of time management functions to use for a present system state.

6. The system of claim 1 and including means for applying rule based logic to system conditions to determine functional operations of the system.

7. The system of claim 6 wherein the functional operations comprise:

obtaining and storing incoming communications criteria;

storing and recording communications data;

playing, storing, and recording outgoing messages (OGM); announcing incoming communications;

user notification of incoming communication events;

obtaining and storing time criteria;

obtaining and storing associated time management functions;

obtaining and storing the receiving party's communications device functional operations; and invoking call forwarding.

8. The system of claim 6 in which an emergency operation is executed upon a determination of an emergency condition by the receiving party's communication device per the receiving party's pre-selected functional operations.

9. The system of claim 8 further comprising:

means for receiving and storing an incoming communication emergency indication; and means for retrieving the receiving party's communication device operation to be executed upon an emergency condition indication.

10. The system of claim 9 further comprising:

means for receiving and decoding DTMF inputs from an incoming communication source;

means for reading the emergency indication; and means for invoking the designated device operation to be executed upon an emergency condition indication.

11. The system of claim 1 wherein the incoming communication source criteria is a function of the identity of the calling party.

12. The system of claim 1 wherein the incoming communication source criteria is a function of the identity of an originating call device.

13. The system of claim 1 wherein the incoming communication source criteria depends on an account identity.

14. The system of claim 1 wherein the incoming communication source criteria depends on a network identity.

15. The system of claim 1 wherein the incoming communication source criteria depends on an identity of the incoming communication subject.

16. The system of claim 1 further comprising means for storing and processing system states by storing associated system functional operations to be used while the system is in a given state.

17. The system of clam 16 further comprising means for storing and processing said system states and for invoking associated system functional operations to be used while said system is in a given state.

18. The system of claim 17 wherein the system state is selected from the group comprising:

a normal mode;

a silence mode;

an environmental mode wherein the device operates as a function of present location conditions; and an intended usage mode wherein the device operates as a function of communications types to be supported.

19. A method for obtaining and storing communication criteria and data sent to a receiving party's communications device to eliminate a need for a receiving party to program the communications device while tailoring the device to the receiving party's personal needs, comprising:

supplying the receiving party with a communications device that possesses default values for device usage;

receiving incoming communication via the communications device;

storing data associated with the incoming communication in the communications device;

reviewing the incoming communications data;

selecting, by the receiving party, to delete or store the incoming communication originating source criteria, wherein the source criteria comprises data selected from a plurality of originating source criteria, a plurality of time criteria and a plurality of associated relative classification criteria and wherein the originating source criteria has at least partial influence on a present incoming communication conditional operation and including using incoming communication associated relative classification criteria and the associated time management criteria along with the device state data to revise present conditions and applying the present conditions to a set of Fuzzy Logic rules that determine the consequential operational behavior of the communications device;

selecting a relative classification or the originating source criteria upon selection of storing; and accumulating and personalizing the originating source criteria without excessive data entry requiring by the communication device user, from the steps of selecting.

20. The method of claim 19 where the Fuzzy Logic rules include performing a specific device operation given the present associated relative classification and the associated time management functions.

* * * * *